(12) United States Patent
Yadav et al.

(10) Patent No.: US 10,606,630 B2
(45) Date of Patent: Mar. 31, 2020

(54) SYSTEM AND METHOD FOR PRESERVING ENTITY IDENTIFIERS

(71) Applicant: Nutanix, Inc., San Jose, CA (US)

(72) Inventors: Pulkit Yadav, Bangalore (IN); Supreeth Srinivasan, Bengaluru (IN); Raghu Prasad Rapole, Telangana (IN); Anil Kumar Boggarapu, Bangalore (IN); Raja Prathyush Kumar Thota, Banalore (IN); Rahul Paul, Bangalore (IN)

(73) Assignee: NUTANIX, INC., San Jose, CA (US)

(*) Notice: Subject to any disclaimer, the term of this patent is extended or adjusted under 35 U.S.C. 154(b) by 213 days.

(21) Appl. No.: 15/887,379

(22) Filed: Feb. 2, 2018

(65) Prior Publication Data

US 2019/0243671 A1 Aug. 8, 2019

(51) Int. Cl.
*G06F 9/455* (2018.01)

(52) U.S. Cl.
CPC .......... *G06F 9/45558* (2013.01); *G06F 9/455* (2013.01); *G06F 9/45533* (2013.01); *G06F 2009/4557* (2013.01)

(58) Field of Classification Search
None
See application file for complete search history.

(56) References Cited

U.S. PATENT DOCUMENTS

| | | |
|---|---|---|
| 8,352,608 B1 | 1/2013 | Keagy et al. |
| 8,549,518 B1 | 10/2013 | Aron et al. |
| 8,601,473 B1 | 12/2013 | Aron et al. |
| 8,850,130 B1 | 9/2014 | Aron et al. |
| 9,396,004 B1* | 7/2016 | Bester ............... G06F 9/44505 |
| 9,424,062 B1 | 8/2016 | Mummidi et al. |
| 9,672,060 B2* | 6/2017 | Behere ............... G06F 9/45558 |

(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Qing Yuan Wu
(74) *Attorney, Agent, or Firm* — Foley & Lardner LLP (57) ABSTRACT

A system and method include assigning, by an identifier management system of a virtual computing system, a hypervisor agnostic identifier to a virtual machine. The system and method also include creating a mapping of the hypervisor agnostic identifier to a first hypervisor specific identifier of the virtual machine, including storing the mapping in a database, and updating the mapping in response to a second hypervisor specific identifier being associated with the virtual machine. The updated mapping maps the hypervisor agnostic identifier to the second hypervisor specific identifier. The system and method further include making available the hypervisor agnostic identifier for use by other elements of the virtual computing system instead of the first hypervisor specific identifier and the second hypervisor specific identifier. The first hypervisor specific identifier and the second hypervisor specific identifier are hypervisor specific, while the hypervisor agnostic identifier is not hypervisor specific.

36 Claims, 4 Drawing Sheets

(56) References Cited

U.S. PATENT DOCUMENTS

| | | |
|---|---|---|
| 9,772,866 B1 | 9/2017 | Aron et al. |
| 2005/0268298 A1 | 12/2005 | Hunt et al. |
| 2009/0055507 A1 | 2/2009 | Oeda |
| 2013/0139154 A1 | 5/2013 | Shah |
| 2013/0139155 A1 | 5/2013 | Shah |
| 2014/0229944 A1 | 8/2014 | Wang et al. |
| 2015/0234611 A1 | 8/2015 | Mutalik et al. |
| 2015/0324216 A1 | 11/2015 | Sizemore et al. |
| 2015/0324217 A1 | 11/2015 | Shilmover et al. |
| 2015/0358404 A1 | 12/2015 | Ayanam et al. |
| 2016/0019053 A1 | 1/2016 | Gambardella et al. |
| 2016/0062779 A1 | 3/2016 | Tsirkin |
| 2016/0203014 A1* | 7/2016 | Gschwind ........... G06F 9/45558 718/1 |
| 2016/0306648 A1 | 10/2016 | Deguillard et al. |
| 2016/0306649 A1 | 10/2016 | Gunti et al. |
| 2016/0335109 A1 | 11/2016 | Ryu et al. |
| 2016/0378547 A1 | 12/2016 | Brouwer et al. |
| 2017/0168903 A1 | 6/2017 | Dornemann et al. |
| 2017/0371691 A1 | 12/2017 | Gunti et al. |
| 2018/0060057 A1 | 3/2018 | Dake |
| 2018/0241617 A1 | 8/2018 | Radzikowski et al. |
| 2018/0329737 A1 | 11/2018 | Dong et al. |
| 2019/0034240 A1 | 1/2019 | Nabi et al. |
| 2019/0079790 A1 | 3/2019 | Tagashira |

OTHER PUBLICATIONS

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Cano, Ignacio, et al. "Curator: Self-Managing Storage for Enterprise Clusters" (Mar. 27, 2017), from https://www.usenix.org/conference/nsdi17/.

* cited by examiner

SYSTEM AND METHOD FOR PRESERVING ENTITY IDENTIFIERS

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. Each virtual machine is managed by a hypervisor or virtual machine monitor running on the host machine. The configuration of the virtual machines is specific to the underlying hypervisor type. Any time the underlying hypervisor type is changed, the associated virtual machines need to be reconfigured. However, the present day mechanism for reconfiguring virtual machines has limitations due to the configuration of the virtual computing systems and the way they operate.

SUMMARY

In accordance with at least some aspects of the present disclosure, a method is disclosed. The method includes assigning, by an identifier management system of a virtual computing system, a hypervisor agnostic identifier to a virtual machine, creating, by the identifier management system, a mapping of the hypervisor agnostic identifier to a first hypervisor specific identifier of the virtual machine, including storing the mapping in a database of the virtual computing system, and updating, by the identifier management system, the mapping in response to a second hypervisor specific identifier being associated with the virtual machine. The updated mapping maps the hypervisor agnostic identifier to the second hypervisor specific identifier. The method also includes making available, by the identifier management system, the hypervisor agnostic identifier for use by other elements of the virtual computing system instead of the first hypervisor specific identifier and the second hypervisor specific identifier. The first hypervisor specific identifier and the second hypervisor specific identifier are hypervisor specific, while the hypervisor agnostic identifier is not hypervisor specific.

In accordance with some other aspects of the present disclosure, a system is disclosed. The system includes an identifier management system in a virtual computing system including a database configured to store a mapping of hypervisor agnostic identifiers and a processing unit. The processing unit is configured to assign an instance of the hypervisor agnostic identifiers to each virtual machine in the virtual computing system, create the mapping of the hypervisor agnostic identifiers to first hypervisor specific identifiers of each of the virtual machines, including storing the mapping in the database, and update the mapping of one or more of the virtual machines in response to a second hypervisor specific identifier being associated with the one or more of the virtual machines. The updated mapping maps the hypervisor agnostic identifiers of the one or more virtual machines to the second hypervisor specific identifiers. The processing unit is also configured to make available the hypervisor agnostic identifiers for use by other elements of the virtual computing system instead of the first hypervisor specific identifiers and the second hypervisor specific identifiers. The first hypervisor specific identifiers and the second hypervisor specific identifiers are hypervisor specific, while the hypervisor agnostic identifiers are not hypervisor specific.

In accordance with yet other embodiments of the present disclosure, a non-transitory computer readable media is disclosed. The non-transitory computer readable media includes computer-executable instructions that, when executed by a processor of an identifier management system of a virtual computing system, cause the identifier management system to perform a process including assigning a hypervisor agnostic identifier to a virtual machine, creating a mapping of the hypervisor agnostic identifier to a first hypervisor specific identifier of the virtual machine, including storing the mapping in a database of the virtual computing system, and updating the mapping in response to a second hypervisor specific identifier being associated with the virtual machine. The updated mapping maps the hypervisor agnostic identifier to the second hypervisor specific identifier. The process further includes making available the hypervisor agnostic identifier for use by other elements of the virtual computing system instead of the first hypervisor specific identifier and the second hypervisor specific identifier. The first hypervisor specific identifier and the second hypervisor specific identifier are hypervisor specific, while the hypervisor agnostic identifier is not hypervisor specific.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a virtual computing system having a plurality of clusters, with each cluster having a plurality of nodes. Each of the plurality of nodes includes one or more virtual machines managed by an instance of a hypervisor. The one or more virtual machines have a variety of configuration parameters associated therewith that allow those virtual machines to perform their intended functions. The configuration parameters of the one or more virtual machines may include information such as identity information (e.g., name, universally unique identifier, etc.), number of processing units (e.g., virtual central processing units), amount of memory, location of data and metadata, network settings, etc. At least some of those configuration parameters are assigned by the hypervisor associated with the one or more virtual machines.

As an example, the identifiers of the one or more virtual machines, which uniquely identify the virtual machines and distinguish the virtual machines from each other, are assigned by the underlying hypervisor. These hypervisor assigned identifiers are hypervisor specific (and particularly specific to the "type" of the hypervisor) and termed as hypervisor specific identifiers. If the underlying hypervisor is changed, the associated virtual machines are assigned new hypervisor specific identifiers by the new hypervisor.

An example of an event that may cause the hypervisor to change is hypervisor conversion. For example, in some embodiments, the hypervisor may be converted from a first hypervisor type to a second hypervisor type. Converting a hypervisor from the first hypervisor type to the second hypervisor type also entails converting the underlying virtual machines to be operative on the second hypervisor type. Converting the virtual machines in turn entails reconfiguring those virtual machines, including assigning new hypervisor specific identifiers by the hypervisor of the second hypervisor type. Another event that may cause the hypervisor to change is virtual machine migration. In some cases (e.g., for disaster recovery, etc.), the virtual machines may be migrated from one cluster to another cluster. The two clusters may be running on different types of hypervisors. By virtue of being migrated to another cluster, the hypervisor type of the virtual machines may change. The hypervisor of the other cluster then assigns new hypervisor specific identifiers to the virtual machines. Other events may cause the type of hypervisor to change, requiring assignment of new hypervisor specific identifiers to the associated virtual machines.

Further, the hypervisor specific identifiers are used by other elements in the virtual computing system. For example, the hypervisor specific identifiers are used by other components, processes, applications running on virtual machines, etc. (collectively referred to herein as "elements") of the virtual computing system to make routine calls, input/output requests, etc. to the virtual machines and to identify those virtual machines. Thus, when the hypervisor specific identifiers of the virtual machines change, all the other elements using those identifiers have to be updated with the new hypervisor specific identifiers. Conventionally, this updating is done manually by a user. In some cases, a delay might exist between the time that the new hypervisor specific identifiers have been assigned and the time that the various elements have been manually updated. During this delay, the normal operation of those elements may be disrupted. Thus, technical problems currently exist in which the hypervisor specific identifiers of the virtual machines are not automatically updated in the various elements using those hypervisor specific identifiers.

The present disclosure provides solutions. For example, the present disclosure provides an identifier management system that assigns each virtual machine in the virtual computing system a hypervisor agnostic identifier. The hypervisor agnostic identifier is associated with the hypervisor specific identifier of each virtual machine via a mapping. The hypervisor agnostic identifier is not hypervisor specific. When a new hypervisor specific identifier is assigned to any virtual machine, the identifier management system updates the mapping of the hypervisor agnostic identifier to the new hypervisor specific identifier of that virtual machine. Thus, even if the hypervisor specific identifier of a particular virtual machine changes, the hypervisor agnostic identifier of that virtual machine remains the same. Only the mapping is updated from the old to the new hypervisor specific identifier. The updating happens automatically in response to an indication received by the identifier management system of the event that causes new hypervisor specific identifiers to be assigned.

Further, the identifier management system makes the hypervisor agnostic identifiers available to the various elements of the virtual computing system that use the hypervisor specific identifiers. Instead of using the hypervisor specific identifiers, those elements may now use the hypervisor agnostic identifiers. By using the hypervisor agnostic identifiers instead of the hypervisor specific identifiers, those elements now do not have to worry about any operational delays or problems due to the hypervisor specific identifiers changing. Since the hypervisor agnostic identifiers do not change when the hypervisor specific identifiers change, those elements may continue using the hypervisor agnostic identifiers without much disruption. Thus, the present disclosure improves the operation of the virtual machines and the other elements in the virtual computing system.

Figure 1:
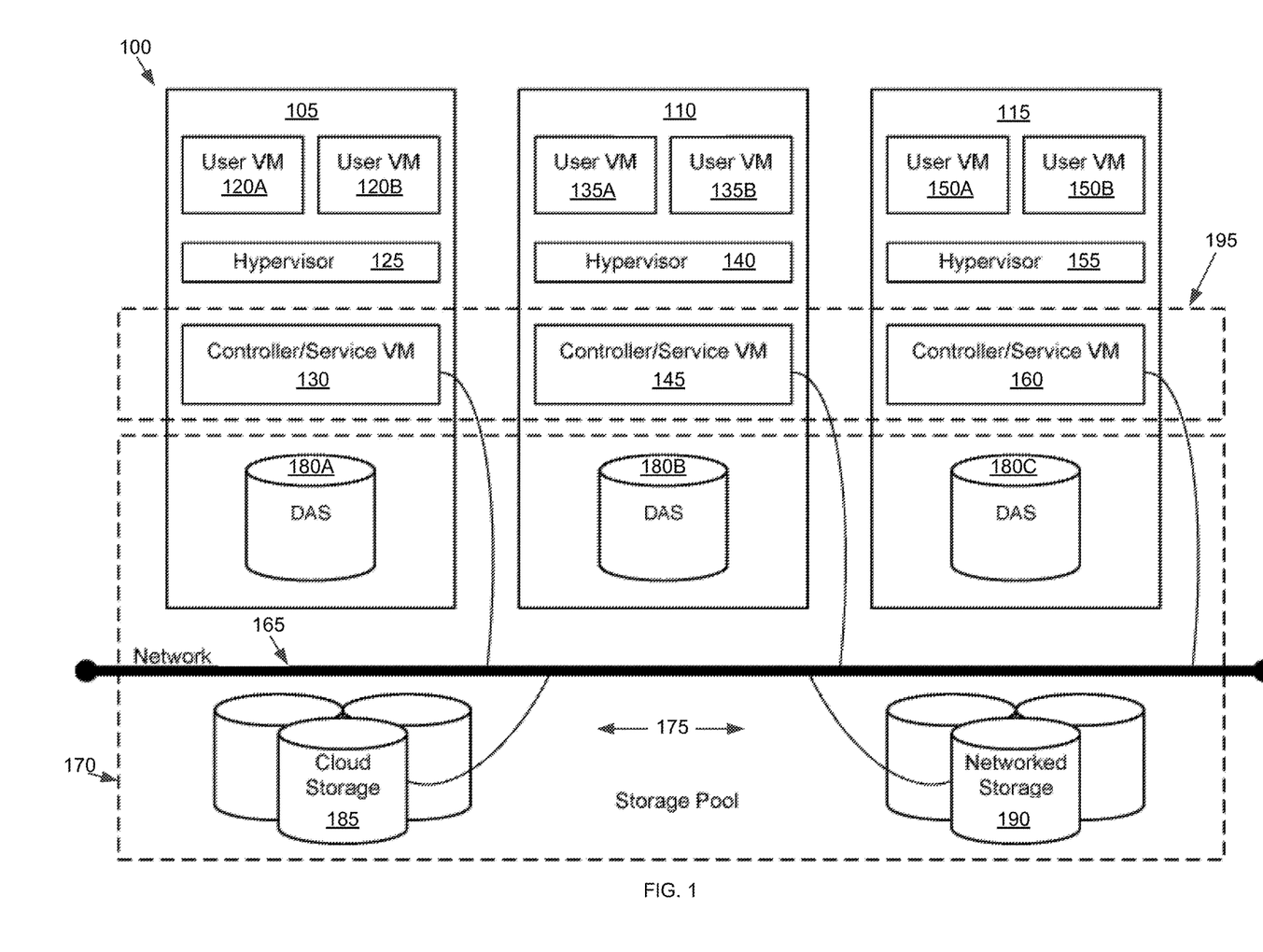
FIG. 1 is a block diagram of a virtual computing system, in accordance with some embodiments of the present disclosure.

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 may be accessible via the network 165 and, in some embodiments, may include cloud storage 185, as well as local storage area network 190. In contrast to the network-attached storage 175, which is accessible via the network 165, the direct-attached storage 180A, 180B, and 180C may include storage components that are provided within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system to perform the functions described herein are contemplated and considered within the scope of the present disclosure. Some additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may be organized in a variety of network topologies.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170, including the network-attached storage 175 and the direct-attached storage 180A, 180B, and 180C, may together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may also include a local management system (e.g., Prism Element from Nutanix, Inc.) configured to manage various tasks and operations within the virtual computing system 100. For example, in some embodiments, the local management system may manage the reconfiguration of the user VMs 120, the user VMs 135, and the user VMs 150, as explained in greater detail below, that may be needed due to changes in the respective hypervisor 125, the hypervisor 140, and the hypervisor 155.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, or the user VMs 135) may direct an input/output request to the controller/service VM (e.g., the controller/service VM 130, the controller/service VM 145, or the controller/service VM 160) on the underlying node (e.g., the first node 105, the second node 110, or the third node 115). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself The controller/service VM of the leader node may fulfil the input/output request (and/or request another component within the virtual computing system 100 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments, although not shown, the virtual computing system 100 includes a central management system (e.g., Prism Central from Nutanix, Inc.) that is configured to manage and control the operation of the various clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components of the virtual computing system 100 are shown and described herein. Nevertheless, other components that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Figure 2:
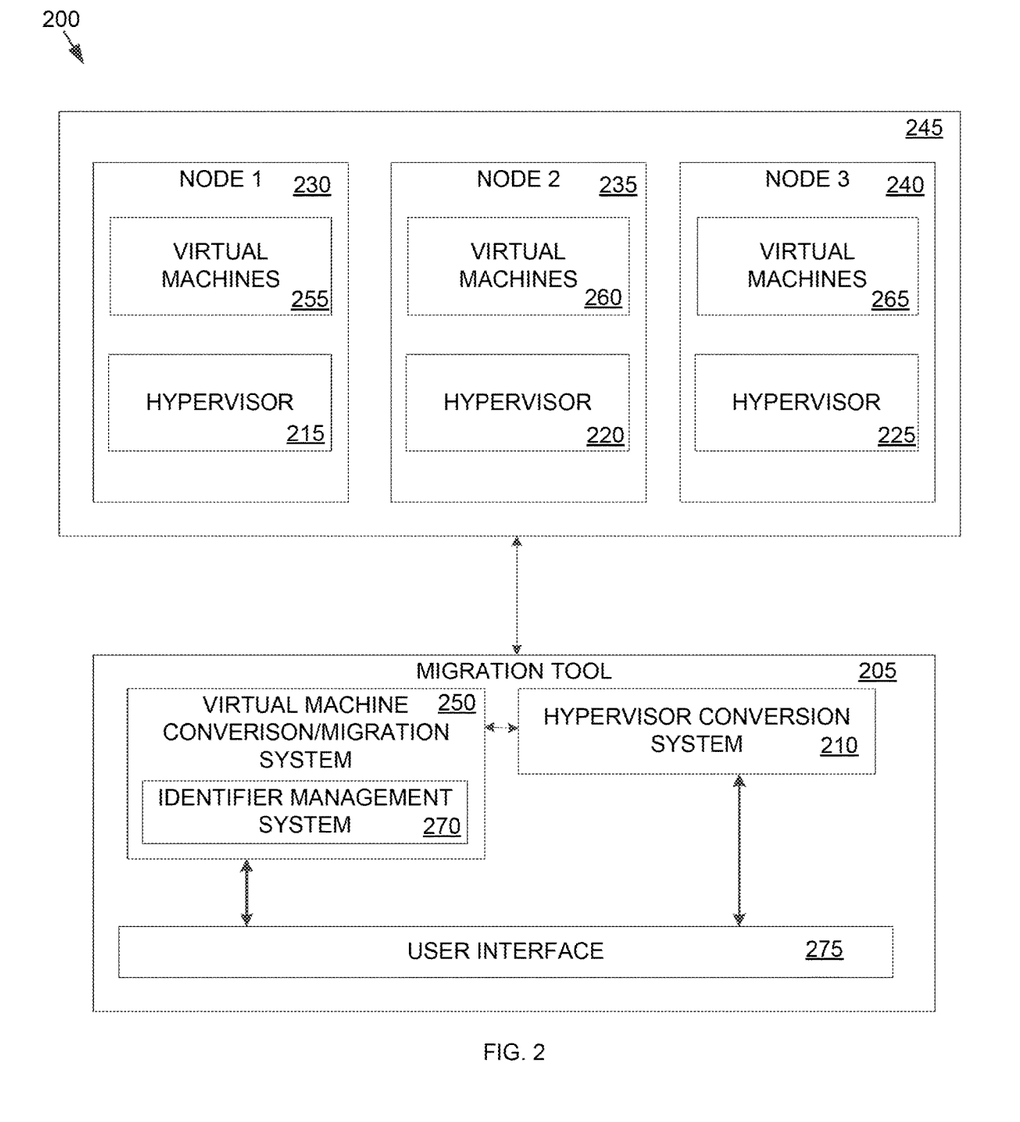
FIG. 2 is a block diagram of a conversion system of the virtual computing system of FIG. 1, in accordance with some embodiments of the present disclosure.

Turning to FIG. 2, a block diagram of a conversion system 200 is shown, in accordance with some embodiments of the present disclosure. Among other tasks, the conversion system 200 may be used for reconfiguring virtual machines. As discussed above, the configuration of the virtual machines is hypervisor specific. Thus, the virtual machines running on a particular node are specifically configured for the hypervisor that is also running on that particular node. When the type of the underlying hypervisor is changed (e.g., due to hypervisor conversion from a first hypervisor type to a second hypervisor type), the virtual machines associated with that hypervisor have to be reconfigured for the new type of hypervisor. The conversion system 200 facilitates such reconfiguration of the virtual machines resulting from hypervisor conversion.

Additionally, in some cases, the virtual machines running on one cluster may need to be migrated to another cluster. The source cluster and the destination cluster may be running on different types of hypervisors. Since the configuration of the virtual machines is hypervisor specific, the virtual machines may need to be reconfigured when migrating across clusters. Again, the conversion system 200 facilitates the reconfiguration. Thus, the conversion system 200 is used to reconfigure the virtual machines any time the underlying hypervisor type of the virtual machines changes. In other embodiments, the conversion system 200 may be used to reconfigure the virtual machines due to another event that requires a reconfiguration of the virtual machines.

The conversion system 200 may also be configured for performing additional tasks, some of which are explained briefly below. For example, in some embodiments, the conversion system 200 may be used for converting a particular hypervisor from a first hypervisor type to a second hypervisor type. The conversion system 200 may also be used for converting the virtual machines initially running on the first hypervisor type to run on the second hypervisor type. In addition to converting the virtual machines for the second hypervisor type, the conversion system 200 may be used for automatically reconfiguring the virtual machines after the hypervisor conversion, as noted above. The conversion system 200 may be configured for performing other designated tasks as well.

To perform one or more of the tasks described above, the conversion system 200 includes a migration tool 205. In some embodiments, the migration tool 205 may be part of the controller/service VM (e.g., the controller/service VM 130, the controller/service VM 145, the controller/service VM 160 in FIG. 1). Specifically, when part of the controller/service VM (e.g., the controller/service VM 130, the controller/service VM 145, the controller/service VM 160), the migration tool 205 may reside within the local management system (e.g., Prism Element) of the controller/service VM. Further, in some embodiments, an instance of the migration tool 205 may be located on the controller/service VM of each node (e.g., the first node 105, the second node 110, and the third node 115), but the migration tool on the leader node may manage the tasks at hand. In other embodiments, the migration tool 205 that is located on a node other than the leader node may be designated to perform those tasks.

In other embodiments, the migration tool 205 may be located on the central management system (e.g., Prism Central) that manages each of the clusters of the virtual computing system (e.g., the virtual computing system 100). In yet other embodiments, an instance of the migration tool 205 may be located on both the local management system and the overall management system. In yet other embodiments, the migration tool 205 may be part of another component within or associated with the virtual computing system (e.g., the virtual computing system 100). Thus, the location of the migration tool 205 within the virtual computing system may vary from one embodiment to another.

Further, although not shown, the migration tool 205 may be configured as hardware, software, firmware, or a combination thereof. Specifically, the migration tool 205 may include one or more processing units configured to execute instructions and one or more memory units to store those instructions and other conversion related data. In some embodiments, the migration tool 205 may be connected to a storage pool (e.g., the storage pool 170) to receive, send, and process information, and to control the operations of the conversion. The instructions may be carried out by a special purpose computer, logic circuits, or hardware circuits of the migration tool 205. The processing units may, thus, be implemented in hardware, firmware, software, or any combination thereof. The processing units execute an instruction, meaning that they perform the operations called for by that instruction. The processing units may retrieve a set of instructions from a memory (e.g., the storage pool 170 or any other memory associated with the migration tool in which such instructions may be stored). For example, in some embodiments, the processing units may retrieve the instructions from a permanent memory device like a read only memory (ROM) device and copy the instructions in an executable form to a temporary memory device that is generally some form of random access memory (RAM). The ROM and RAM may both be part of the storage pool (e.g., the storage pool 170), or in some embodiments, may be separately provisioned from the storage pool. Further, the processing units may include a single stand-alone processing unit, or a plurality of processing units that use the same or different processing technology. The instructions may be written using one or more programming language, scripting language, assembly language, etc.

The migration tool 205 may include a hypervisor conversion system 210 to facilitate conversion of a hypervisor from the first hypervisor type to the second hypervisor type. For example, the hypervisor conversion system 210 may facilitate conversion of one or more of a hypervisor 215, hypervisor 220, and hypervisor 225 of a respective first node 230, second node 235, and third node 240 of a cluster 245. "Conversion" of one or more of the hypervisor 215, the hypervisor 220, and the hypervisor 225 (or like terms such as "converting" of the hypervisor, etc.) as used herein means uninstalling the hypervisor (which is of a first hypervisor type) from the associated one of the first node 230, the second node 235, the third node 240 and installing a new hypervisor (which is of a second hypervisor type) on those associated node(s). Simply as an example and without any intention to be limiting in any way, one or more of the hypervisor 215, the hypervisor 220, and the hypervisor 225 may be converted from an ESXi type of hypervisor to an AHV type of hypervisor. When the migration tool 210 is not configured to facilitate hypervisor conversion, the hypervisor conversion system 210 may not be provided.

The migration tool 205 also includes a virtual machine conversion/migration system 250 configured to convert virtual machines 255, virtual machines 260, and virtual machines 265 in response to the hypervisor conversion. "Conversion" of the virtual machines 255, the virtual machines 260, and the virtual machines 265 (or like terms such as "converting" of the virtual machines, etc.) as used herein means optimizing the virtual machines to run on the underlying hypervisor (e.g., the hypervisor 215, the hypervisor 220, the hypervisor 225). The virtual machine conversion/migration system 250 may also be configured to migrate the one or more of the virtual machines 255, the virtual machines 260, and the virtual machines 265 from the cluster 245 to another cluster. In some cases, the cluster 245 and the another cluster to which the virtual machines 255, the virtual machines 260, and the virtual machines 265 are migrated may be running on different types of hypervisors. "Migrating" a virtual machine (e.g., the virtual machines 255, the virtual machines 260, and the virtual machines 265) from a source node (e.g., the first node 230, the second node 235, the third node 240) of a cluster (e.g., the cluster 245) to a destination node on another cluster means creating an instance of the virtual machine being migrated on the destination node, deleting the virtual machine from the source node, and reconfiguring the virtual machine on the destination node to properly run on the hypervisor running on the destination node.

Thus, both hypervisor conversion and virtual machine migration may entail changing certain configurations of the virtual machines 255, the virtual machines 260, and the virtual machines 265. For example, among other changes, an identifier associated with the virtual machines 255, the virtual machines 260, and the virtual machines 265 may need to be changed to allow those virtual machines to properly run on the underlying hypervisor.

Although the hypervisor conversion system 210 and the virtual machine conversion/migration system 250 are shown as separate components, in some embodiments, the hypervisor conversion system and the virtual machine conversion/migration system may be combined into a single component. Also, although both virtual machine conversion and virtual machine migration is described as being performed by the virtual machine conversion/migration system 250, in other embodiments, virtual machine conversion and virtual machine migration may be performed by separate components or sub-components within the virtual machine conversion/migration system. Also, similar to the migration tool 205, the hypervisor conversion system 210 and the virtual machine conversion/migration system 250 may be configured as hardware, software, firmware, or a combination thereof having one or more processing units configured to execute instructions for reconfiguring the virtual machines 255, the virtual machines 260, and the virtual machines 265.

The migration tool 205, and particularly the virtual machine conversion/migration system 250, also includes the identifier management system 270. The identifier management system 270 is used for managing the identifiers of the virtual machines 255, the virtual machines 260, and the virtual machines 265. As discussed above, each virtual machine within a virtual computing system (e.g., the virtual computing system 100) includes an identifier or key that uniquely identifies that virtual machine and distinguishes that virtual machine from other virtual machines within the virtual computing system. Thus, each of the virtual machines 255, the virtual machines 260, and the virtual machines 265 is associated with a unique identifier. In some embodiments, the identifier of the virtual machines 255, the virtual machines 260, and the virtual machines 265 is a universally unique identifier ("UUID"), also referred to as a globally unique identifier ("GUID"). The UUID or GUID is a 128-bit number that may be associated with the virtual machines 255, the virtual machines 260, and the virtual machines 265 for identifying those virtual machines. In other embodiments, the UUID or GUID may be of another bit length and may include characters other than, or in addition to, numbers. In some embodiments, the identifiers of the virtual machines 255, the virtual machines 260, and the virtual machines 265 may be structured in formats other than UUID or GUID. In such cases, the identifiers for each of the virtual machines 255, the virtual machines 260, and the virtual machines 265 may be numerical, alphabetic, alphanumerical, or use other representations.

Further, the identifiers of the virtual machines 255, the virtual machines 260, and the virtual machines 265 are hypervisor specific (more particularly, specific to the type of the hypervisor). Thus, each hypervisor assigns these identifiers (also referred to herein as "hypervisor specific identifiers") to the virtual machines associated therewith at the time of creation of the virtual machines. For example, the hypervisor 215 assigns the hypervisor specific identifiers to the virtual machines 255 when those virtual machines are created. Similarly, the hypervisor 220 assigns the hypervisor specific identifiers to the virtual machines 260 at the time of creation of those virtual machines, and the hypervisor 225 assigns the hypervisor specific identifiers to the virtual machines 265 upon creation of those virtual machines. The hypervisor specific identifiers of the virtual machines 255, the virtual machines 260, and the virtual machines 265 are stored within a database of (or associated with) the identifier management system 270.

Since the hypervisor specific identifiers are hypervisor specific, when the underlying hypervisor type is changed (e.g., due to hypervisor conversion or the virtual machines migrating to a node having a different type of hypervisor, etc.), the underlying hypervisor on the destination node assigns new identifiers to the virtual machines. When new hypervisor specific identifiers are assigned, the various processes, routines, applications, etc. within the virtual computing system (e.g., the virtual computing system 100) that use those identifiers need to be updated with the new identifiers. As indicated above, this updating is conventionally done manually. However, the identifier management system 270 provides a mechanism in which the various processes, routines, applications, etc. that use the hypervisor specific identifiers of the virtual machines 255, the virtual machines 260, and the virtual machines 265 do not need to be updated when those hypervisor specific identifiers change. Specifically, the identifier management system 270 provides a mechanism for assigning hypervisor agnostic identifiers to the virtual machines 255, the virtual machines 260, and the virtual machines 265, such that the hypervisor agnostic identifiers are not dependent upon the underlying hypervisor. In other words, the hypervisor agnostic identifiers are not hypervisor specific. The identifier management system 270 is discussed in greater detail below in FIGS. 3 and 4.

To clarify, the hypervisor specific identifiers of the virtual machines 255, the virtual machines 260, and the virtual machines 265 change when a "type" of the hypervisor is changed. For example, the hypervisor specific identifiers of the virtual machines 255, the virtual machines 260, and the virtual machines 265 change when the respective hypervisor 215, the hypervisor 220, and the hypervisor 225, respectively, are converted from a first type (e.g., ESXi) to a second type (e.g., AHV). If the "type" of the underlying hypervisor is not changed, then the hypervisor specific identifiers of the virtual machines 255, the virtual machines 260, and the virtual machines 265 do not change. Across the same type of hypervisors, the same hypervisor specific identifiers may be used. Thus, for example, if the hypervisor 215, the hypervisor 220, and the hypervisor 225 of the virtual machines 255, the virtual machines 260, and the virtual machines 265, respectively, are simply updated from a first version of the first type of hypervisor to a second version of the first type of hypervisor, then the hypervisor specific identifiers of those virtual machines will not change. Similarly, if the virtual machines 255, the virtual machines 260, and the virtual machines 265 are migrated to another node and the hypervisors of the another node are of the same type as the hypervisor 215, the hypervisor 220, and the hypervisor 225 (e.g., both source and destination hypervisors are ESXi or both are AHV, etc.), then the hypervisor specific identifiers of those virtual machines do not change.

Further, although the identifier management system 270 is shown as being part of the virtual machine conversion/migration system 250, in other embodiments, the identifier management system and the virtual machine conversion/migration system may be separate components.

Referring still to FIG. 2, the migration tool 205 also includes a user interface 275. The user interface 275 is used to receive an input or indication from a user. In some embodiments, the indication may be to convert from the first hypervisor type to the second hypervisor type. In other embodiments, the indication may be to migrate one or more of the virtual machines 255, the virtual machines 260, and the virtual machines 265 from the cluster 245 to another cluster. The user interface 275 may present one or more displays to the user presenting one or more options (e.g., as menu items). The user may interact with those options to start a process. For example, the user may interact with a hypervisor conversion option for starting a hypervisor conversion process by the hypervisor conversion system 210. Similarly, the user may interact with a virtual machine migration option to start a virtual machine migration process by the virtual machine conversion/migration system 250.

Upon receiving the indication (e.g., input) from the user to start the hypervisor conversion or virtual machine migration process, the user interface 275 may send the indication to the hypervisor conversion system 210 and/or the virtual machine conversion/migration system 250. In response to receiving the indication from the user interface 275, hypervisor conversion system 210 and/or the virtual machine conversion/migration system 250 start the process for converting the hypervisor, converting the virtual machines, and/or migrating the virtual machines depending upon the indication received from the user interface. In response to the start of such processes, the identifier management system 270 also starts a process for associating previously assigned hypervisor agnostic identifiers to the new hypervisor specific identifiers of the virtual machines after the hypervisor conversion or the virtual machine migration process.

It is to be understood that only some components of the migration tool 205 are shown and described herein. Nevertheless, the migration tool 205 may include other components that are considered desirable or needed to perform the functions described herein. Such components are contemplated and considered within the scope of the present disclosure.

Further, the first node 230, the second node 235, and the third node 240 are analogous to the first node 105, the second node 110, and the third node 115, respectively, discussed with respect to FIG. 1 above. Although each of the first node 230, the second node 235, and the third node 240 have been shown as having only their respective hypervisors (e.g., the hypervisor 215, the hypervisor 220, and the hypervisor 225, respectively) and their respective virtual machines (e.g., the virtual machines 255, the virtual machines 260, and the virtual machines 265, respectively), each of the first node, the second node, and the third node have additional components (e.g., the controller/service VM), as discussed above. Further, the number of the virtual machines 255, the virtual machines 260, and the virtual machines 265 on each of the first node 230, the second node 235, and the third node 240, respectively, may vary from one another, as also discussed above. Further, when the migration tool 205 is part of the controller/service VM (e.g., the controller/service VM 130, the controller/service VM 145, the controller/service VM 160), the migration tool may be located within the first node 230, the second node 235, and the third node 240 of the cluster 245. While only three of the nodes (e.g., the first node 230, the second node 235, and the third node 240) are shown in FIG. 2 within the cluster 255, in other embodiments, the number of nodes within the cluster may vary from fewer than three to greater than three.

Figure 3:
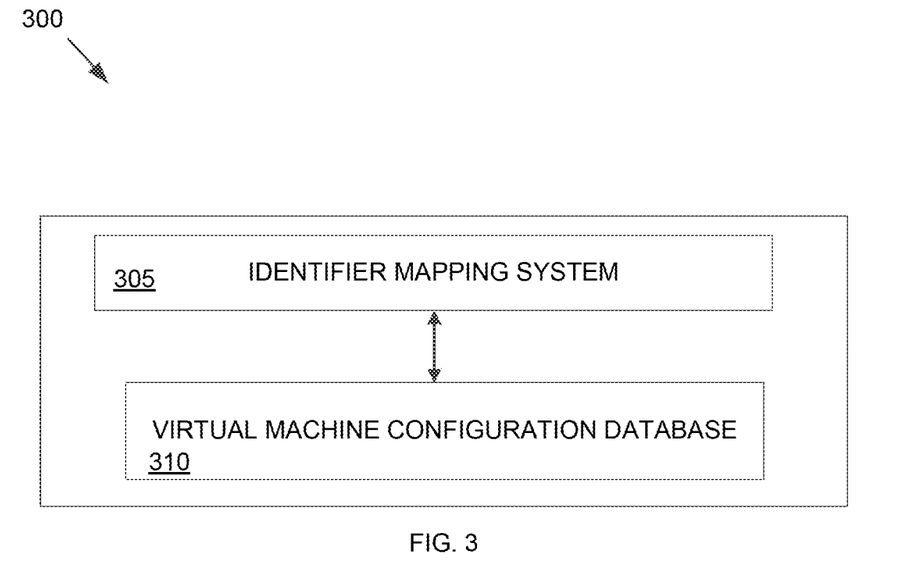
FIG. 3 is a block diagram of an identifier management system of the conversion system of FIG. 2, in accordance with some embodiments of the present disclosure.

Turning now to FIG. 3, a block diagram of an identifier management system 300 is shown, in accordance with some embodiments of the present disclosure. The identifier management system 300 is analogous to the identifier management system 270 of FIG. 2. The identifier management system 300 is used to assign hypervisor agnostic identifiers to each virtual machine with which the identifier management system is associated. Specifically, the identifier management system 300 includes an identifier mapping system 305 that is configured to assign hypervisor agnostic identifiers and map those hypervisor agnostic identifiers to hypervisor specific identifiers. The identifier management system 300 also includes a virtual machine configuration database 310 that is configured to store various configuration related details of each virtual machine that is managed by the identifier management system. Although the virtual machine configuration database 310 is shown as being part of the identifier management system 300, in other embodiments, the virtual machine configuration database may be separate from, but communicably associated with, the identifier management system.

Although only the identifier mapping system 305 and the virtual machine configuration database 310 have been shown as being part of the identifier mapping system, in other embodiments, the identifier management system may include other components that may be considered necessary or desirable for performing the functions described herein.

In some embodiments, an instance of the identifier management system 300 is located on the local management system (e.g., Prism Element) on the controller/service VM of each node and another instance of the identifier management system is located on the overall or central management system (e.g., Prism Central). In other embodiments, the identifier management system 300 may be on either the local management system or the overall management system. When the identifier management system 300 is part of the local management system (either alone or along with an instance on the overall management system), the identifier management system on the leader node may be designated to perform the various operations, as detailed below. Further, in some embodiments, the identifier management system 300 on the underlying node may be configured to assign hypervisor agnostic identifiers to the virtual machines that are on the same node as the local management system. For example and referring to FIG. 1 in conjunction with FIG. 3, when the identifier management system 300 is part of the local management system, an instance of the identifier management system resides on each of the controller/service VM 130, the controller/service VM 145, and the controller/ service VM 160. In such cases, the identifier management system 300 of the controller/service VM 130 is configured to assign hypervisor agnostic identifiers to the user VMs 120, the identifier management system of the controller/service VM 145 is configured to assign the hypervisor agnostic identifiers to the user VMs 135, and the management system of the controller/service VM 160 is configured to assign the hypervisor agnostic identifiers to the user VMs 150. In other embodiments, the identifier management system 300 on the leader node of a cluster may be designated to assign the hypervisor agnostic identifiers to all the virtual machines in that cluster.

When the identifier management system 300 is part of the overall management system only, the identifier management system is configured to assign hypervisor agnostic identifiers to all virtual machines of all clusters that are managed by the overall management system. The overall management system may communicate with the various nodes via the local management system of those respective nodes. Thus, based upon the location of the identifier management system 300 within the virtual computing system 100, the virtual machines that the identifier management system manages may vary.

To assign the hypervisor agnostic identifiers, the identifier mapping system 305 of the management system 300 is in direct or indirect communication with the hypervisor. For example and again with reference to FIG. 1, when the identifier management system 300 is located within the controller/service VM of each node, the identifier mapping system 305 of the controller/service VM 130 communicates with the hypervisor 125 to assign hypervisor agnostic identifiers to the user VMs 120. Similarly, the identifier mapping system 305 of the controller/service VM 145 communicates with the hypervisor 140 to assign hypervisor agnostic identifiers to the user VMs 135, and so on. In some embodiments, the identifier mapping system 305 of the leader node communicates with all hypervisors within the cluster to assign the hypervisor agnostic identifiers. If the identifier management system 300 is part of the overall management system, the identifier mapping system 305 of the management system may communicate with the hypervisor of each node of each cluster managed by the overall management system.

Further, in some embodiments, the identifier mapping system 305 need not directly communicate with the associated hypervisor. Rather, the identifier mapping system 305 may communicate with another component that receives information from the hypervisor. For example, in some embodiments, the hypervisor may store various configuration details of the hypervisor and the underlying virtual machines in a database (e.g., the virtual machine configuration database 310 or another database in the storage pool 170). The identifier mapping system 305 may communicate with these databases instead to receive the information that the identifier mapping system needs to assign the hypervisor agnostic identifiers.

The identifier mapping system 305 receives the hypervisor specific identifiers of each virtual machine that the identifier management system 300 is managing. For example, and with reference to FIG. 1, when the identifier management system 300 is part of the local management system, the identifier mapping system 305 controller/service VM 130 receives the hypervisor specific identifiers of the user VMs 120 (either from the hypervisor 125 or another component where the hypervisor specific information is available). Similarly, the identifier mapping system 305 of the controller/service VM 145 receives the hypervisor specific identifiers of the user VMs 135 (either from the hypervisor 140 or another component where the hypervisor specific information is available), and so on. When the leader node is responsible for assigning the hypervisor agnostic identifiers, the leader node receives the hypervisor specific identifiers. When part of the overall management system, the identifier mapping system 305 simply receives (either from the associated hypervisors or other components) the hypervisor specific information of all virtual machines on all the nodes of all the clusters that are being managed by the overall management system.

Based upon the hypervisor specific identifiers, the identifier mapping system 305 assigns hypervisor agnostic identifiers and creates a mapping from the hypervisor agnostic identifiers to the hypervisor specific identifiers. As mentioned above, the hypervisor agnostic identifiers are not hypervisor specific. In contrast, the hypervisor specific identifiers are hypervisor specific and subject to changing.

For example, when the hypervisor on a particular node creates new virtual machines on that node, among other configuration details, the hypervisor assigns each virtual machine on that node a hypervisor specific identifier. The configuration details, including the hypervisor specific identifier information of the virtual machines is stored in the virtual machine configuration database 310. For example, with continued reference to FIG. 1, when the hypervisor 125 creates the user VMs 120, the hypervisor assigns each of the user VMs a hypervisor specific identifier, that is unique and different from the hypervisor specific identifier of the other user VMs on that node (e.g., the first node 105). Similarly, the hypervisor 140 assigns each of the user VMs 135 a hypervisor specific identifier at the time of creating those user VMs and the hypervisor 155 assigns hypervisor specific identifiers to the user VMs 150.

When the hypervisor 125, the hypervisor 140, or the hypervisor 155 are converted from a first type to a second type, new instances of the user VMs 120, the user VMs 135, or the user VMs 150 are also created on those nodes. Further, the second type of hypervisor assigns new hypervisor specific identifiers to the newly created instances of the user VMs 120, the user VMs 135, or the user VMs 150, respectively. Similarly, when the user VMs 120, the user VMs 135, or the user VMs 150 are migrated to another cluster having a type of hypervisor that is different from the type of the hypervisor 125, the hypervisor 140, or the hypervisor 155, the hypervisor of the destination cluster assigns new hypervisor specific identifiers to those user VMs.

Further, when a new hypervisor specific identifier is assigned to a particular virtual machine, the new hypervisor specific identifier replaces the old hypervisor specific identifier of that particular virtual machine. Due to the replacement, all other components, processes, routines, etc. that were using the old hypervisor specific identifier need to be updated manually with the new hypervisor specific identifier. By assigning hypervisor agnostic identifiers, the elements (e.g., components, processes, applications, routines, etc.) that use hypervisor specific identifiers may instead use the hypervisor agnostic identifiers. Since the hypervisor agnostic identifiers are not hypervisor specific and do not change when the hypervisor specific identifiers change, the various components, processes, applications, routines, etc. do not need to be updated constantly.

The identifier mapping system 305 assigns hypervisor agnostic identifiers to the virtual machines being managed during creation of those virtual machines. Thus, when the virtual machines are created and the underlying hypervisor assigns those virtual machines the hypervisor specific identifiers, the identifier mapping system 305 assigns those virtual machines hypervisor agnostic identifiers. Thus, each virtual machine being created has both, a hypervisor specific identifier that is hypervisor specific and a hypervisor agnostic identifier that is not hypervisor specific. The identifier mapping system 305 also maintains a mapping of each virtual machine's hypervisor agnostic identifier to that virtual machine's hypervisor specific identifier.

When a particular virtual machine gets a new hypervisor specific identifier, the identifier mapping system 305 updates the mapping of that virtual machine's hypervisor agnostic identifier to that virtual machine's new hypervisor specific identifier. Since the hypervisor agnostic identifier of that virtual machine remains the same even though the hypervisor specific identifier has changed, any elements that use the hypervisor agnostic identifier of that virtual machine do not see any disruptions and do not need to be updated.

Further, in addition to assigning and mapping the hypervisor agnostic identifiers, the identifier mapping system 305 updates the virtual machine configuration entry of each virtual machine that is assigned the hypervisor agnostic identifier in the virtual machine configuration database 310. Specifically, the identifier mapping system 305 associates the hypervisor agnostic identifier of each virtual machine with the configuration entry of that virtual machine in the virtual machine configuration database 310. An example configuration entry of a virtual machine having the name "test_1," a hypervisor specific identifier ("hs_uuid") of "esx_hs_uuid_1," a hypervisor agnostic identifier ("ha_uuid") of "ha_uuid_1," and operating in a normal state may look like following in the virtual machine configuration database 310:

ha_uuid_1: {hs_uuid: "esx_hs_uuid_1", vm_name: test_1, state: normal}

It is to be understood that the format of the configuration entry above, including the format of the various variables, and the information included in that configuration entry is simply an example. In other embodiments, the configuration entry may have other or additional types of information, and the format of the various variables and of the configuration entry in general may vary. By associating the hypervisor agnostic identifier of "ha_uuid_1" with the virtual machine, "test_1," the identifier mapping system 305 ensures that the various elements that use the hypervisor specific identifier of that virtual machine instead use that virtual machine's hypervisor agnostic identifier.

Figure 4:
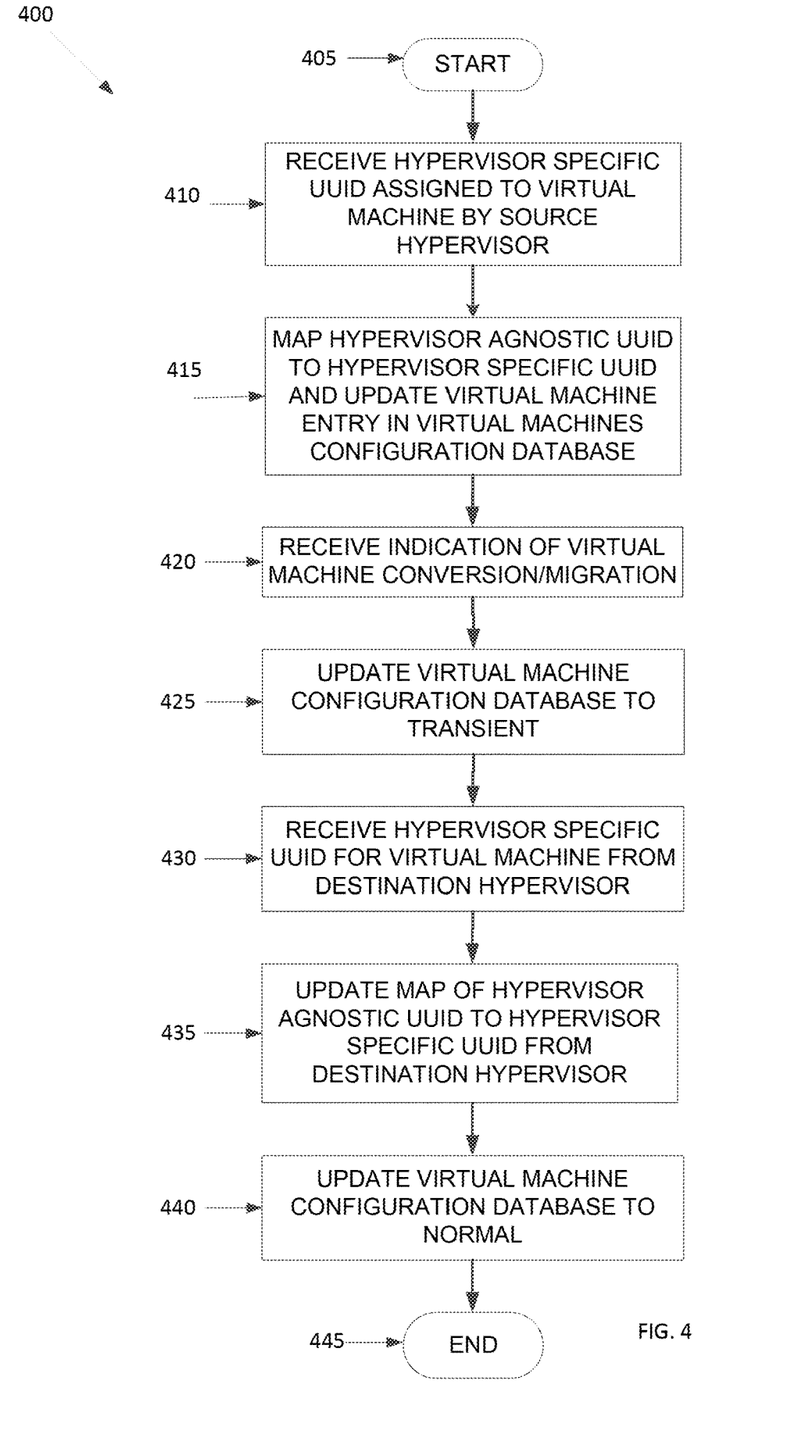
FIG. 4 is an example flowchart outlining operations for preserving virtual machine identifiers within the virtual computing system of FIG. 1, in accordance with some embodiments of the present disclosure.

Referring now to FIG. 4, a flowchart outlining a process 400 for preserving the identifiers of virtual machines is shown, in accordance with some embodiments of the present disclosure. The process 400 may include additional, fewer, or different operations, depending on the particular embodiment. Further, the process 400 is described in conjunction with FIGS. 2 and 3. The process 400 is implemented by the identifier management system 300. The process 400 is used for assigning hypervisor agnostic identifiers to virtual machines when the virtual machines are reconfigured due to hypervisor conversion, virtual machine migration to a node having a different type of hypervisor (e.g., in another cluster), or due to any event that causes a change in the hypervisor specific identifiers of those virtual machines. The process 400 is used for creating a mapping from the hypervisor agnostic identifiers to the hypervisor specific identifiers, and for updating the mapping when the hypervisor specific identifiers change.

Thus, after starting at operation 405, the identifier management system 300 assigns hypervisor agnostic identifiers to the virtual machines that previously did not have hypervisor agnostic identifiers assigned. When the identifier management system 300 is on the overall management system only, then the identifier management system may be configured to assign the hypervisor agnostic identifiers to "new virtual machines" created on all of the clusters in the virtual computing system. When the identifier management system 300 is on the local management system (either alone or along with an instance on the overall management system), either the identifier management system on the underlying node on which the "new virtual machines" are to be created or the identifier management system of the leader node may be configured to assign the hypervisor agnostic identifiers to those "new virtual machines." When an instance of the identifier management system 300 is on the overall management system and an instance of the identifier management system is also on the local management system, the local management system may be designated to assign the hypervisor agnostic identifiers to the "new virtual machines" as indicated above.

It is to be understood that each virtual machine is only assigned one hypervisor agnostic identifier. Thus, even though a particular virtual machine may migrate to another node and a new instance of that virtual machine may be created on that node and a new hypervisor specific identifier may be assigned to that new instance of the virtual machine, the new instance of the virtual machine is not considered a "new virtual machine" for purposes of assigning hypervisor agnostic identifiers. Specifically, a new instance of the virtual machine is not considered a "new virtual machine" for purposes of assigning hypervisor agnostic identifier since a hypervisor agnostic identifier already exists for that virtual machine (e.g., for the virtual machine based on which the new instance of the virtual machine was created). In such cases, the identifier management system 300 simply updates the internal mapping to the new instance of the virtual machine, as discussed further below.

Thus, the identifier management system 300 assigns hypervisor agnostic identifiers to those virtual machines that previously did not have hypervisor agnostic identifiers associated therewith. For assigning hypervisor agnostic identifiers, the identifier management system 300 receives the hypervisor specific identifiers of the virtual machines being managed at operation 410. As indicated above, the hypervisor specific identifiers are assigned to the virtual machines at the time of creation of those virtual machines. The identifier management system 300 may receive those hypervisor specific identifiers either directly from the hypervisor that assigned the hypervisor specific identifiers or from another component that knows or has access to the hypervisor specific identifiers. In some embodiments, the identifier management system 300 may periodically (or continuously) poll the hypervisor (or the other components) for checking whether any virtual machines have been created that previously have not been assigned hypervisor agnostic identifiers. In other embodiments, the identifier management system 300 may be notified by the hypervisor (or the other components) when such new virtual machines are created.

Upon receiving the hypervisor specific identifiers of the virtual machines that previously did not have hypervisor agnostic hypervisors, the identifier management system 300 assigns each of those virtual machines a unique hypervisor agnostic identifier. The format of the hypervisor agnostic identifier may be similar to or different from the format of the hypervisor specific identifier. In some cases, the hypervisor agnostic identifier may also be of the UUID format. In other embodiments, the hypervisor agnostic identifier may have a different type of format.

In addition to assigning the hypervisor agnostic identifiers, the identifier management system 300 creates a mapping of those hypervisor agnostic identifiers at operation 415. Specifically, the identifier management system 300 maps the hypervisor agnostic identifiers of each of the virtual machines to the hypervisor specific identifiers of those virtual machines. The mapping may be in the form of a look-up table or in any other format. An example mapping from the hypervisor agnostic identifiers to the hypervisor specific identifiers may be as follows:

ha_uuid_1: esx_hs_uuid_1

In the mapping above, "ha_uuid_1" is the hypervisor agnostic identifier of virtual machine 1 and "esx_hs_uuid_1" is the hypervisor specific identifier of the virtual machine 1 that is running on an ESXi type of hypervisor. It is to be understood that the format of the mapping and the variables used in the mapping above are only an example. The actual format of the mapping and the variables used may vary. The identifier management system 300 creates a mapping from hypervisor agnostic identifier to hypervisor specific identifier for each virtual machine that is managed by the identifier management system. The identifier management system 300 also stores the mapping in a database (e.g., the storage pool 170 of FIG. 1, the virtual machine configuration database 310, etc.).

In addition to creating the mapping, the identifier management system 300 updates a configuration entry of the virtual machine in the virtual machine configuration database 310. An example of what the configuration entry of a virtual machine may look like after being associated with the hypervisor agnostic identifier is as follows:

ha_uuid_1: {hs_uuid: "esx_hs_uuid_1", vm_name: test_1, state: normal}

In the configuration entry above, the "ha_uuid_1" is the hypervisor agnostic identifier of virtual machine 1, "hs_uuid" is the variable name for the hypervisor specific identifier, "esx_hs_uuid_1" is the "hs_uuid" value for virtual machine 1 running on an ESXi hypervisor, "vm_name" is the variable name for a virtual machine, "test_1" is the "vm_name" value for virtual machine 1, "state" is the current state of operation (e.g., normal, transient, error, etc.) of a virtual machine, and "normal" indicates that the virtual machine 1 is operating in a normal state (e.g., no problems reported for that virtual machine). It is to be understood that the format and variable names/values in the configuration entry above are only an example and may vary. Further, only a sampling of the types of variables that are associated with a virtual machine's configuration entry are shown above. In other embodiments, variables in addition to or other than the hypervisor specific identifier, virtual machine name, and virtual machine state may be included.

By mapping the hypervisor agnostic identifier to the hypervisor specific identifier and by associating the hypervisor agnostic identifier with the configuration entry of a particular virtual machine, the identifier management system 300 may ensure that the hypervisor agnostic identifier may be safely used instead of the hypervisor specific identifier to correctly refer to the associated virtual machine, without any confusion. The identifier management system 300 makes the hypervisor agnostic identifiers available to the users and/or the various elements for use.

At operation 420, the identifier management system 300 receives an indication that one or more virtual machines under management of the identifier management system is being converted to a new type of hypervisor, migrating to a node with a different hypervisor (e.g., migrating to another cluster), or otherwise undergoing an event that may lead to the virtual machine being managed by a different type of hypervisor. The virtual machines undergoing the event are termed herein as "impacted virtual machines." In some embodiments, the identifier management system 300 may receive the indication directly from the impacted virtual machines, from the hypervisor associated with those impacted virtual machines, from the virtual machine conversion/migration system 250, or any other component having knowledge of the event.

The indication may indicate the type of event (e.g., hypervisor conversion, virtual machine migration, etc.) and any other information (e.g., destination node after virtual machine migration, etc.) that may be relevant for the identifier management system 300. Upon receiving the indication at the operation 420, the identifier management system 300 updates the configuration entry of the impacted virtual machines in the virtual machine configuration database 310 at operation 425. Specifically, the identifier management system 300 updates the "state" field of the configuration entry from "normal" to "transient." By changing the "state" of the impacted virtual machines, the identifier management system 300 ensures that no other management operation is performed on those virtual machines until those virtual machines have completed the event, new hypervisor specific identifiers have been assigned to the impacted virtual machines, and the mapping has been updated with the new hypervisor specific identifiers.

Further, at operation 430, the identifier management system 300 receives the new hypervisor specific identifiers. For example, if the event is hypervisor conversion, the hypervisor associated with the impacted virtual machines is converted from a first type to a second type. Additionally, the impacted virtual machines are converted and reconfigured to run on the second type of the hypervisor. As part of the conversion and reconfiguration of the impacted virtual machines, the second type of the hypervisor assigns new hypervisor specific identifiers to the converted instances of the impacted virtual machines. The identifier management system 300 receives these new hypervisor specific identifiers. Similarly, if the event is virtual machine migration, the impacted virtual machines are migrated from a source node (e.g., the node on which the impacted virtual machines reside before the migration) to a destination node (e.g., the node on which the impacted virtual machines reside after the migration). The hypervisor on the source node may be of a different type than the hypervisor on the destination node. In such cases, the hypervisor on the destination node assigns new hypervisor specific identifiers to the newly created instances of the impacted virtual machines on the destination node. These new hypervisor specific identifiers are provided to the identifier management system 300.

Further, in case of hypervisor conversion, the underlying node of the hypervisor undergoing the hypervisor conversion does not change. For example, if the hypervisor undergoing hypervisor conversion is located on Node 1 before the hypervisor conversion, that hypervisor is still located on Node 1 after the conversion. In such cases, the same instance of the identifier management system 300 both, receives the indication of the operation 420 and receives the new hypervisor specific identifiers at the operation 430. For example, the identifier management system 300 on the leader node may receive the indication of the operation 420 and the new hypervisor specific identifiers at the operation 430. If the leader node is the node being converted, another leader node may be selected. However, in case of virtual machine migration, two separate nodes (e.g., the source node and the destination node) are involved. The source node and the destination node may be part of separate clusters. The cluster in which the source node is located is the source cluster and the cluster in which the destination node is located is called the destination cluster. To facilitate the migration of the virtual machines, the identifier management system 300 on the overall management system receives the indication of the operation 420 and then informs the identifier management system (e.g., of the leader node) of the local management system on the source cluster of the virtual machine migration. The local management system of the source cluster may then update the configuration entries of the virtual machines being migrated to "transient," as indicated above in the operation 425. In addition, after the migration of the virtual machines, the identifier management system 300 of the overall management system may communicate with the identifier management system on the local management system (e.g., on the leader node) of the destination cluster and provide the hypervisor agnostic identifiers of the virtual machines that have migrated from the source cluster. The identifier management system 300 on the local management system of the destination cluster then receives the new hypervisor specific identifiers of the operation 430 and updates the mapping, as described below in operation 435.

Specifically, at the operation 435, the identifier management system 300 that received the new hypervisor specific identifiers at the operation 430 updates the hypervisor agnostic identifier to hypervisor specific identifier mapping to the new hypervisor specific identifiers. For example, the identifier management system 300 replaces the old hypervisor specific identifier in the mapping with the new hypervisor specific identifier. An example of the mapping before the updating is discussed above and reproduced here again:

ha_uuid_1: esx_hs_uuid_1

The above mapping may be updated as follows with the new hypervisor specific identifier:

ha_uuid_1: ahv_hs_uuid_1

In the updated mapping above, "ahv_hs_uuid_1" is the new hypervisor specific identifier on an AHV hypervisor. Again, the mapping above is simply an example and the format/variables may vary.

By virtue of updating the mapping, the same hypervisor agnostic identifiers may be associated with the impacted virtual machines even though the hypervisor specific identifiers have changed. Since the various components, processes, etc. use the hypervisor agnostic identifier and not the hypervisor specific identifiers, the change in the hypervisor specific identifiers does not impact those components, processes, etc.

When the identifier management system 300 has updated the mapping, at operation 440, the identifier management system also updates the configuration entry of those virtual machines. For example, the identifier management system 300 may update the "state" of the configuration entry, which had been converted to "transient" at the operation 425 back to "normal" at the operation 440. In some embodiments and particularly when two instances of the identifier management system (e.g., the identifier management system of the source node and the identifier management system of the destination node) are involved, the identifier management system of the destination node may update the configuration entry.

The process 400 ends at operation 445. It is to be understood that the operations 410 and 415 discussed above for assigning hypervisor agnostics identifiers and creating the mapping may be performed at a different time than performance of the operations 420-440. In other words, the identifier management system 300 assigns the hypervisor agnostic identifiers and creates the mapping of the operations 410 and 415 when the virtual machines are created. The identifier management system 300 then does not update the mapping until the indication of the event is received at the operation 420, which may be a different time (e.g., hours, days, or months later) than when the mapping was created.

Thus, the present disclosure provides an easy mechanism for managing the reconfiguration of virtual machines. Specifically, the present disclosure provides a mechanism for easing the transition for elements that may be impacted due to the reconfiguration of the virtual machines by assigning hypervisor agnostic identifiers. Although the present disclosure has been discussed with respect to identifiers of virtual machines, in other embodiments, the present disclosure may be applied to any entity within the virtual computing system that uses identifiers.

It is also to be understood that in some embodiments, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   assigning, by an identifier management system, a hypervisor agnostic identifier to a virtual machine;
   creating, by the identifier management system, a mapping of the hypervisor agnostic identifier to a first hypervisor specific identifier of the virtual machine, including storing the mapping in a database;
   updating, by the identifier management system, the mapping of the hypervisor agnostic identifier to a second hypervisor specific identifier in response to a hypervisor conversion in which a hypervisor associated with the virtual machine is converted from a first type to a second type, wherein the first hypervisor specific identifier is associated with the first type and the second hypervisor specific identifier is associated with the second type; and
   making available, by the identifier management system, the hypervisor agnostic identifier for use by other elements instead of the first hypervisor specific identifier and the second hypervisor specific identifier,
   wherein the first hypervisor specific identifier and the second hypervisor specific identifier are hypervisor specific and wherein the hypervisor agnostic identifier is not hypervisor specific.

2. The method of claim 1, wherein the identifier management system receives an indication of an event before updating the mapping, and wherein the mapping is updated in response to the event.

3. The method of claim 2, wherein the event is a virtual machine migration in which the virtual machine is migrated from a source node to a destination node, wherein a source hypervisor associated with the virtual machine on the source node is of the first type and a destination hypervisor associated with the virtual machine on the destination node is of the second type.

4. The method of claim 2, wherein the identifier management system updates a configuration entry of the virtual machine in a virtual machine configuration database to a transient state in response to the indication.

5. The method of claim 1, wherein the hypervisor of the first type assigns the first hypervisor specific identifier and the hypervisor of the second type assigns the second hypervisor specific identifier.

6. The method of claim 1, wherein the identifier management system updates a configuration entry of the virtual machine to a normal state after updating the mapping.

7. The method of claim 1, wherein the identifier management system assigns the hypervisor agnostic identifier to the virtual machine upon creation of the virtual machine.

8. The method of claim 1, wherein the identifier management system associates the hypervisor agnostic identifier with a configuration entry of the virtual machine in a virtual machine configuration database.

9. The method of claim 1, wherein the identifier management system of a leader node updates the mapping.

10. The method of claim 1, further comprising receiving, by the identifier management system, the first hypervisor specific identifier of the virtual machine before assigning the hypervisor agnostic identifier to the virtual machine.

11. A system comprising:
    a database; and
    a processor having programmed instructions that, when executed, cause the processor to:
    assign a hypervisor agnostic identifier to a virtual machine;
    create a mapping of the hypervisor agnostic identifier to a first hypervisor specific identifier of the virtual machine, including storing the mapping in the database;
    update the mapping of the hypervisor agnostic identifier of the virtual machine to a second hypervisor specific identifier in response to a hypervisor conversion in which a hypervisor associated with the virtual machine is converted from a first type to a second type, wherein the first hypervisor specific identifier is associated with the first type and the second hypervisor specific identifier is associated with the second type; and
    make available the hypervisor agnostic identifier for use by other elements instead of the first hypervisor specific identifier and the second hypervisor specific identifier, wherein the first hypervisor specific identifier and the second hypervisor specific identifier are hypervisor specific; and wherein the hypervisor agnostic identifier is not hypervisor specific.

12. The system of claim 11, wherein an instance of the identifier management system is installed on each node of a cluster.

13. The system of claim 12, wherein the identifier management system is part of a local management system within a controller/service virtual machine on each node of the cluster.

14. The system of claim 11, wherein at least one of the hypervisor agnostic identifier, the first hypervisor specific identifier, and the second hypervisor specific identifier is a universally unique identifier.

15. The system of claim 11, wherein the database stores a configuration entry of the virtual machine.

16. A non-transitory computer readable media with computer-executable instructions embodied thereon that, when executed by a processor, cause the processor to perform a process comprising:
assigning a hypervisor agnostic identifier to a virtual machine;
creating a mapping of the hypervisor agnostic identifier to a first hypervisor specific identifier of the virtual machine, including storing the mapping in a database;
updating the mapping of the hypervisor agnostic identifier to a second hypervisor specific identifier in response to a hypervisor conversion in which a hypervisor associated with the virtual machine is converted from a first type to a second type, wherein the first hypervisor specific identifier is associated with the first type and the second hypervisor specific identifier is associated with the second type; and
making available the hypervisor agnostic identifier for use by other elements instead of the first hypervisor specific identifier and the second hypervisor specific identifier, wherein the first hypervisor specific identifier and the second hypervisor specific identifier are hypervisor specific; and
wherein the hypervisor agnostic identifier is not hypervisor specific.

17. The non-transitory computer readable media of claim 16, further comprising updating a configuration entry of the virtual machine in a virtual machine configuration database to a transient state before updating the mapping.

18. The non-transitory computer readable media of claim 17, further comprising updating the configuration entry to a normal state after updating the mapping.

19. The non-transitory computer readable media of claim 16, further comprising receiving an indication of an event before updating the mapping, and wherein the mapping is updated in response to the event.

20. The non-transitory computer readable media of claim 19, wherein the event is a virtual machine migration in which the virtual machine is migrated from a source node to a destination node.

21. The non-transitory computer readable media of claim 16, wherein the hypervisor of the first type assigns the first hypervisor specific identifier and the hypervisor of the second type assigns the second hypervisor specific identifier.

22. The non-transitory computer readable media of claim 16, further comprising updating a configuration entry of the virtual machine in a virtual machine configuration database to a transient state in response to the indication.

23. The non-transitory computer readable media of claim 16, further comprising updating a configuration entry of the virtual machine to a normal state after updating the mapping.

24. The non-transitory computer readable media of claim 16, further comprising assigning the hypervisor agnostic identifier to the virtual machine upon creation of the virtual machine.

25. The non-transitory computer readable media of claim 16, further comprising associating the hypervisor agnostic identifier with a configuration entry of the virtual machine in a virtual machine configuration database.

26. A non-transitory computer readable media with computer-executable instructions embodied thereon that, when executed by a processor, cause the processor to perform a process comprising:
mapping a hypervisor agnostic identifier of a hypervisor of a virtual machine to a first hypervisor specific identifier; and
updating the mapping of the hypervisor agnostic identifier to a second hypervisor specific identifier in response to a hypervisor conversion in which the hypervisor is converted from a first type to a second type, wherein the first hypervisor specific identifier is associated with the first type and the second hypervisor specific identifier is associated with the second type; and
wherein the first hypervisor specific identifier and the second hypervisor specific identifier are hypervisor specific and wherein the hypervisor agnostic identifier is not hypervisor specific.

27. The non-transitory computer readable media of claim 26, further comprising updating a configuration entry of the virtual machine in a virtual machine configuration database to a transient state before updating the mapping.

28. The non-transitory computer readable media of claim 27, further comprising updating the configuration entry to a normal state after updating the mapping.

29. The non-transitory computer readable media of claim 26, further comprising receiving an indication of an event before updating the mapping, and wherein the mapping is updated in response to the event.

30. The non-transitory computer readable media of claim 29, wherein the event is a virtual machine migration in which the virtual machine is migrated from a source node to a destination node.

31. A method comprising:
mapping, by an identifier management system, a hypervisor agnostic identifier of a hypervisor of a virtual machine to a first hypervisor specific identifier; and
updating, by the identifier management system, the mapping of the hypervisor agnostic identifier to a second hypervisor specific identifier in response to a hypervisor conversion in which the hypervisor is converted from a first type to a second type, wherein the first hypervisor specific identifier is associated with the first type and the second hypervisor specific identifier is associated with the second type;
wherein the first hypervisor specific identifier and the second hypervisor specific identifier are hypervisor specific and wherein the hypervisor agnostic identifier is not hypervisor specific.

32. The method of claim 31, wherein the identifier management system updates a configuration entry of the virtual machine to a normal state after updating the mapping.

33. The method of claim 31, wherein the identifier management system assigns the hypervisor agnostic identifier to the virtual machine upon creation of the virtual machine.

34. The method of claim 31, wherein the identifier management system associates the hypervisor agnostic identifier with a configuration entry of the virtual machine in a virtual machine configuration database.

35. The method of claim 31, wherein the identifier management system of a leader node updates the mapping.

36. The method of claim 31, further comprising receiving, by the identifier management system, the first hypervisor specific identifier of the virtual machine before assigning the hypervisor agnostic identifier to the virtual machine.

* * * * *